UNITED STATES PATENT OFFICE.

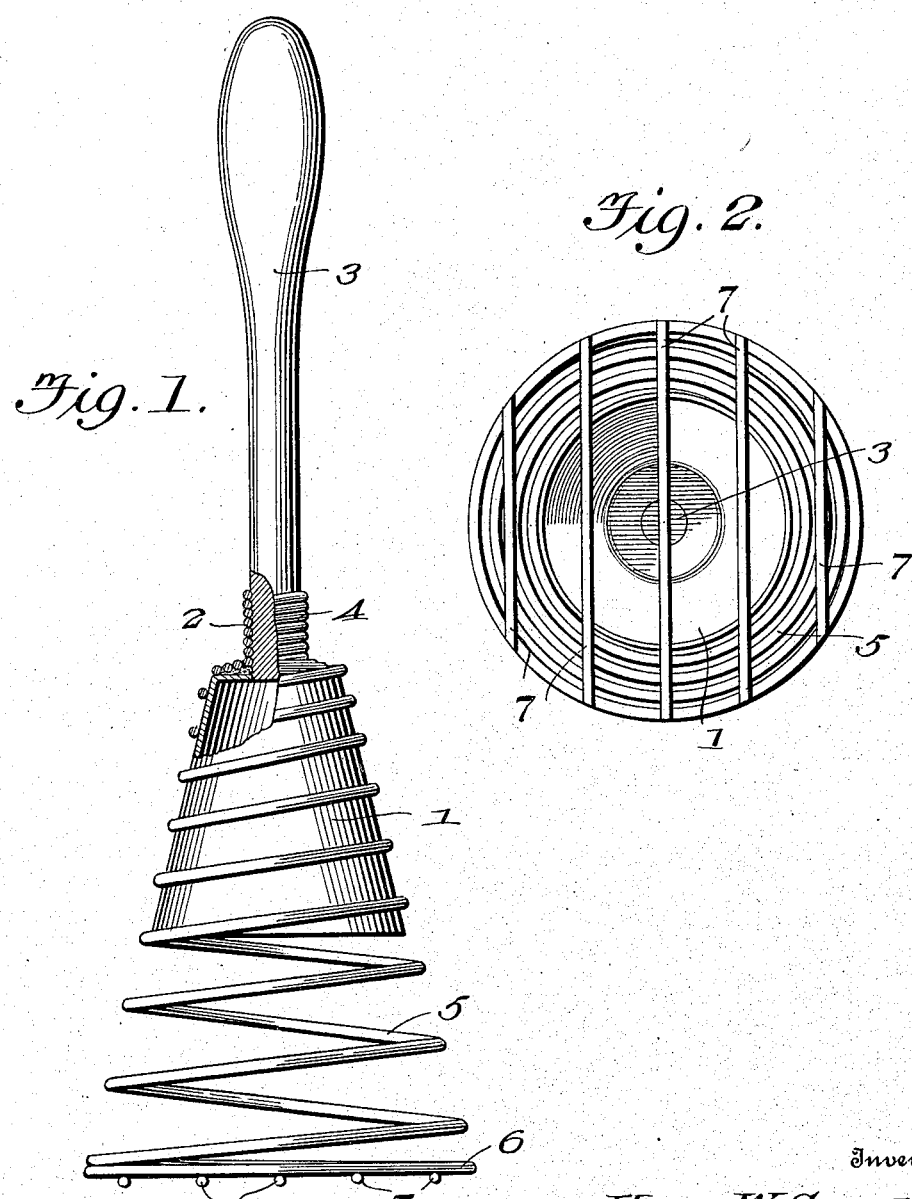

HARRY W. SWEETING, OF ROCHESTER, NEW YORK.

COMBINED KITCHEN UTENSIL.

1,170,358.  Specification of Letters Patent.  Patented Feb. 1, 1916.

Application filed February 26, 1915. Serial No. 10,825.

*To all whom it may concern:*

Be it known that I, HARRY W. SWEETING, a citizen of the United States, residing at Rochester, in the county of Monroe and State of New York, have invented new and useful Improvements in Combined Kitchen Utensils, of which the following is a specification.

This invention is an improved potato masher which is also adapted for use as an egg and cream beater and for crushing fruit, cleaning small articles in soap suds, or gasolene and for churning small quantities of cream and for other analogous uses, the object of the invention being to provide an improved utensil of this class which is cheap and simple in construction, is strong and durable, and which is extremely efficient in use.

The invention consists in the construction, combination and arrangement of devices hereinafter described and claimed.

In the accompanying drawings:—Figure 1 is an elevation partly in section, of a potato masher constructed in accordance with my invention. Fig. 2 is an inverted plan of the same.

In the embodiment of my invention I provide a vacuum cup 1, which is here shown as a truncated conical form, open at its lower end and closed at its upper end and provided with a socket 2 for the reception of the lower end of a handle 3. This socket is formed by coils 4 of reduced diameter at the upper end of a conical coiled beating and mashing spring 5 the upper portion of which is secured around and on the upper side of the cup, the lower larger portion of the coiled spring normally projecting beyond the lower open end of the cup.

The lower end of the coiled beating and mashing spring is formed by a ring 6 across which a series of bars 7 are arranged in spaced relation, the ends of said bars being soldered or otherwise secured to the sides of the base ring.

When in use for mashing potatoes, beating eggs or cream, or for crushing fruits and for other like purposes, the device is operated manually and the potatoes or other material are pounded thereby and in a suitable receptacle. On each down stroke of the masher the potatoes or the like are divided by the bars and the base ring of the spring and also by the forcing of the spring coils therethrough, and the spring contracts, so that the vacuum cup is caused to force air through the potatoes or other material, thereby aerating or creaming the same, as will be understood.

Having thus described my invention I claim:—

The herein described potato masher comprising a vacuum cup opened at its lower end and closed at its upper end, a handle attached to the cup, and a coiled beating spring secured around and extending below the cup, said beating spring having a base ring at its lower end and spaced bars extending across said base ring.

In testimony whereof I affix my signature in presence of two witnesses.

HARRY W. SWEETING.

Witnesses:
ARTHUR L. MIPHAM,
MARY C. CONWAY.

Copies of this patent may be obtained for five cents each, by addressing the "Commissioner of Patents, Washington, D. C."